(12) United States Patent
Troutman et al.

(10) Patent No.: US 12,013,074 B2
(45) Date of Patent: *Jun. 18, 2024

(54) FIRE RESISTANT COMPOSITE POLE SYSTEM

(71) Applicant: CREATIVE PULTRUSIONS, INC., Alum Bank, PA (US)

(72) Inventors: Dustin L. Troutman, Hopewell, PA (US); Jeremy D. Mostoller, Johnstown, PA (US); Ronald Allison, Bedford, PA (US); Terry A. Shank, Jr., New Paris, PA (US); Shane E. Weyant, Bedford, PA (US)

(73) Assignee: CREATIVE PULTRUSIONS, INC., Alum Bank, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,870

(22) Filed: May 3, 2023

(65) Prior Publication Data

US 2023/0272873 A1 Aug. 31, 2023

Related U.S. Application Data

(63) Continuation of application No. 17/221,924, filed on Apr. 5, 2021, now Pat. No. 11,686,418.

(60) Provisional application No. 63/005,843, filed on Apr. 6, 2020, provisional application No. 63/110,604, filed on Nov. 6, 2020.

(51) Int. Cl.
*F16L 57/04* (2006.01)
*F16L 5/04* (2006.01)

(52) U.S. Cl.
CPC ............... *F16L 57/04* (2013.01); *F16L 5/04* (2013.01)

(58) Field of Classification Search
CPC ........ F16L 57/04; F16L 5/04; E04H 12/2292; E04C 3/30; E04C 3/36
USPC ..................................... 52/834, 835
See application file for complete search history.

(56) References Cited

U.S. PATENT DOCUMENTS

| | | | | |
|---|---|---|---|---|
| 2,267,929 A * | 12/1941 | Lefebure | ................ | E04B 1/944 52/612 |
| 4,244,156 A * | 1/1981 | Watts, Jr. | ................ | E04B 1/72 47/2 |
| 5,175,971 A * | 1/1993 | McCombs | ............... | H02G 7/20 52/843 |
| 5,656,231 A * | 8/1997 | Blackmore | ....... | B29C 66/91221 264/408 |
| 5,746,031 A * | 5/1998 | Burns | ...................... | A62C 2/00 52/517 |
| 6,146,576 A * | 11/2000 | Blackmore | ........... | B29C 66/496 425/389 |
| 6,176,062 B1 * | 1/2001 | Fayle | ........................ | E04C 3/30 52/301 |
| 7,479,513 B2 | 1/2009 | Reinheimer et al. | | |
| 8,151,898 B2 * | 4/2012 | Merchant | ................. | A62C 3/16 428/920 |
| 8,256,184 B2 * | 9/2012 | Lowe | ................... | E04H 12/2292 52/170 |

(Continued)

*Primary Examiner* — Brian E Glessner
*Assistant Examiner* — Adam G Barlow
(74) *Attorney, Agent, or Firm* — Vorys, Sater, Seymour and Pease LLP; Mark A. Watkins (57) ABSTRACT

A utility pole system that provides for easy temperature inspection of the fiberglass reinforced plastic utility pole. The system may include utility pole and a sleeve arranged around the pole, and a temperature sensor positioned underneath the sleeve.

20 Claims, 11 Drawing Sheets

(56) References Cited

U.S. PATENT DOCUMENTS

| | | | |
|---|---|---|---|
| 8,713,891 B2* | 5/2014 | Carr | E04G 23/0225 |
| | | | 405/211.1 |
| 10,544,601 B2* | 1/2020 | Van Hoek-Patterson | ............. |
| | | | E04H 12/2292 |
| 11,105,060 B2* | 8/2021 | Van Hoek-Patterson | ............. |
| | | | E04B 1/665 |
| 2005/0210769 A1* | 9/2005 | Harvey | H02G 7/00 |
| | | | 52/101 |
| 2006/0244615 A1* | 11/2006 | Koors | G01W 1/02 |
| | | | 340/601 |
| 2008/0092467 A1* | 4/2008 | Truss | A62C 2/14 |
| | | | 52/232 |
| 2009/0255619 A1* | 10/2009 | Tong | E04B 1/94 |
| | | | 428/41.5 |
| 2010/0231469 A1* | 9/2010 | Kim | H01Q 1/246 |
| | | | 343/890 |
| 2012/0143383 A1* | 6/2012 | Cooperrider | F21S 8/086 |
| | | | 700/295 |
| 2014/0076587 A1* | 3/2014 | Herdman | A62C 3/0257 |
| | | | 29/402.09 |
| 2014/0278150 A1 | 9/2014 | Baesler et al. | |
| 2016/0060892 A1* | 3/2016 | Odegard | E04H 12/2292 |
| | | | 52/835 |
| 2016/0080839 A1* | 3/2016 | Fuchs | H01Q 1/46 |
| | | | 340/870.01 |
| 2017/0210100 A1* | 7/2017 | Leatherman | B32B 27/308 |
| 2020/0101332 A1* | 4/2020 | Ahlisch | F16L 59/145 |
| 2021/0079682 A1* | 3/2021 | Paulin | E04H 12/02 |
| 2021/0247273 A1* | 8/2021 | Kelley | G01M 5/0041 |
| 2022/0111237 A1* | 4/2022 | Paulin | A62C 2/065 |

\* cited by examiner

FIRE RESISTANT COMPOSITE POLE SYSTEM

CROSS-REFERENCE TO RELATED APPLICATIONS

This application claims priority to and the benefit of U.S. Provisional Patent Application No. 63/005,843 filed Apr. 6, 2020 and U.S. Provisional Patent Application No. 63/110,604 filed Nov. 6, 2020, and is a continuation of U.S. patent application Ser. No. 17/221,924 filed Apr. 5, 2021, the disclosures of which are hereby incorporated herein in their entirety.

BACKGROUND

Utility poles are primarily made from wood, which makes them sustainable and easy to manufacture. However, wood poles break down over time and are vulnerable to the elements, and maintaining and replacing utility poles is a significant and costly job. Fiber reinforced polymer ("FRP") poles are now commonly used to improve reliability and resiliency and to reduce repair frequency and cost. FRP poles are advantageous as compared to wooded poles due to their durability and longevity. Thus, FRP poles are often utilized in coastal regions as they will not rust, rot, or corrode like legacy power grid pole materials. In addition, FRP poles are becoming increasingly cheaper to manufacture, and FRP poles themselves can be installed quickly and easily. While FRP poles provide many benefits, their structural integrity may be hampered when exposed to high temperature, such as a forest, brush, or grass fire (i.e., a fire incident). Thus, FRP poles installed in an area prone to forest, grass, or brush fires may experience high temperatures that adversely affect their structural integrity. Accordingly, a need exists for being able to quickly assess structural integrity of FRP poles to ascertain whether they need replacement post fire incident.

SUMMARY

Embodiments herein include a utility pole system, comprising a pole body, a fire retardant sleeve assembly arranged on at least a length of the pole body, the sleeve assembly having an outer shell and an inner insulation layer provided in contact with a surface of the pole body, and at least one temperature sensor positioned beneath the sleeve assembly. In some embodiments, the sleeve assembly includes at least one opening exposing a portion of the pole body at which the at least one temperature sensor is positioned. In some embodiments, the sleeve assembly includes at least one cover plate provided over the opening. In some embodiments, the sleeve assembly includes a locking ring arranged around the sleeve assembly and the cover. In some embodiments, the outer shell comprises a fiberglass material and the inner insulation layer comprises an intumescent material. In some embodiments, the inner insulation layer is fixed to an inner surface of the outer shell via a fire resistant adhesive or resin. In some embodiments, the inner insulation layer is laminated to an inner surface of the outer shell. In some embodiments, the pole is made of a fiber reinforced plastic. In some embodiments, the temperature sensor is configured to measure a maximum temperature experienced at the surface of the pole body. In some embodiments, the sleeve assembly comprises a pair of separable half sections that, when connected together define a hollow cylinder, each separable half section having a U shape cross section. In some embodiments, the system further comprises a locking mechanism for securing the pair of separable half sections together when installed on the pole body. In some embodiments, the sleeve assembly comprises a hollow cylindrical body that is installable on the pole body during manufacture of the pole body. In some embodiments, when installed in a ground surface, the pole body extends upward from a location beneath the ground surface. In some embodiments, the sleeve assembly is arranged on the pole body at a location thereon below the ground surface. In some embodiments, a coating is provided on the outer surface of the outer shell, and such coating may be fire retardant coating and/or a UV protective coating.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to fire resistant pole technology and, more particularly, to systems and methods for inspecting poles for assessing their structural integrity.

Embodiments herein provide fire rated fiberglass reinforced polymer (FRP) utility poles with post-fire strength retention inspection capabilities. Embodiments herein protect FRP poles from fires while providing the utility company (or end user) the ability to inspect the poles post fire to determine the degree of strength retention in the FRP pole, such that the utility can then decide to replace or keep the pole in use. Some embodiments described herein are directed towards sleeves configured to protect utility poles, for example, FRP poles. The fire protection sleeve may comprise an outer layer and an inner layer secured to an interior of the outer layer via a fire-resistant adhesive or resin. In some examples, the outer layer comprises a fiberglass material. In some examples, the inner layer comprises an insulating layer that protects the FRP pole from excessive heat, such as an endothermic mat. In some examples, the inner layer is laminated to the outer layer. Some embodiments herein provide a fire protection sleeve with one or more temperature indicators/sensors configured to provide indication to an end user as to whether the utility pole experienced a fire event and/or to provide indication as to whether the FRP pole was exposed to temperatures above a certain threshold temperature that would indicate whether the FRP pole is still structurally sound (and a new fire protection sleeve may be provided over it) or whether it needs to be replaced.

Figure 1:
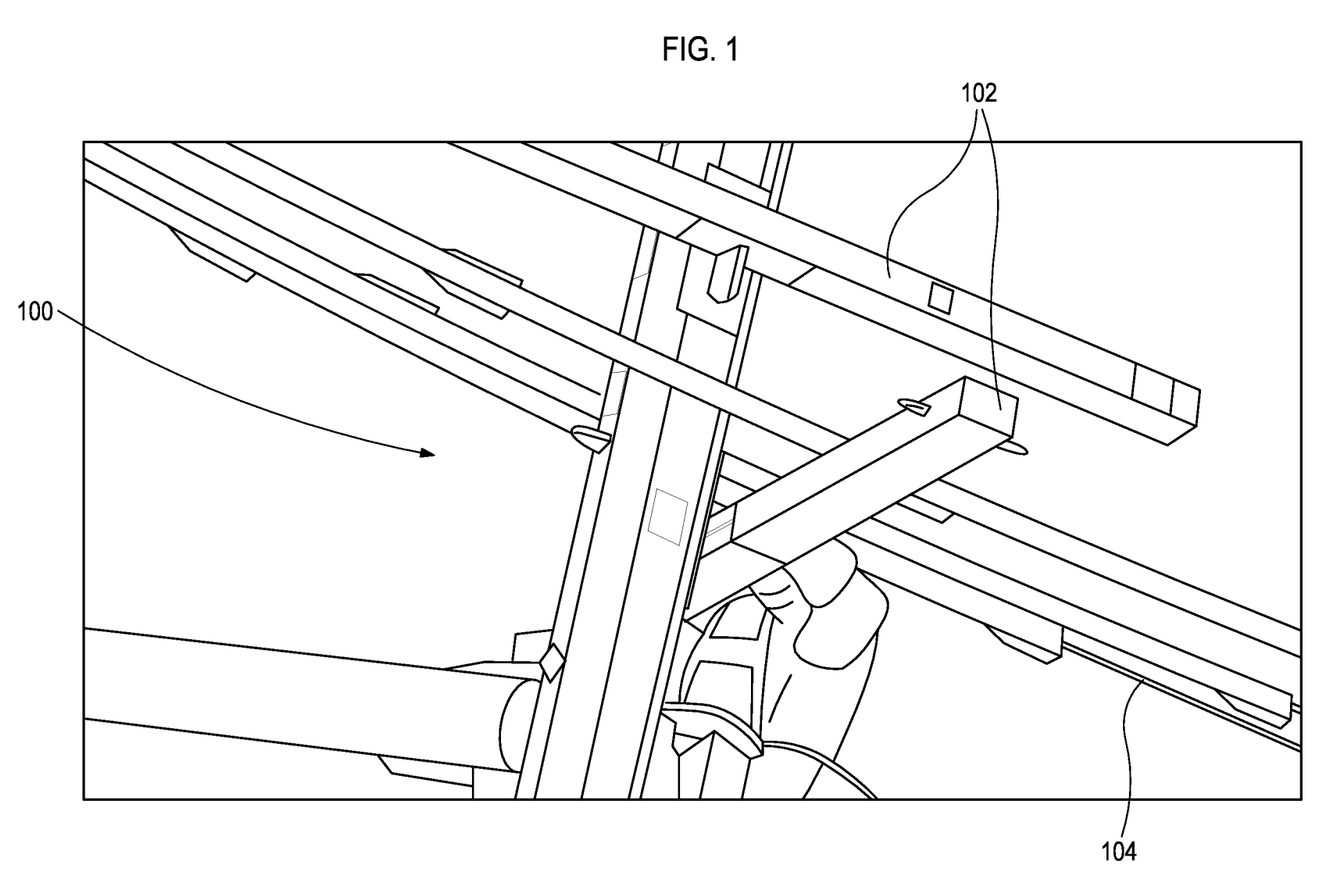
FIG. 1 is an FRP pole that may incorporate the principles of the present disclosure.

FIG. 1 illustrates an exemplary FRP pole 100 that may incorporate aspects of the present disclosure. The FRP pole 100 may include one or more cross-members 102 and be utilized to support electrical, telecommunication, and/or other types of cables 104 at an elevated position above a ground G surface.

Figure 2A:
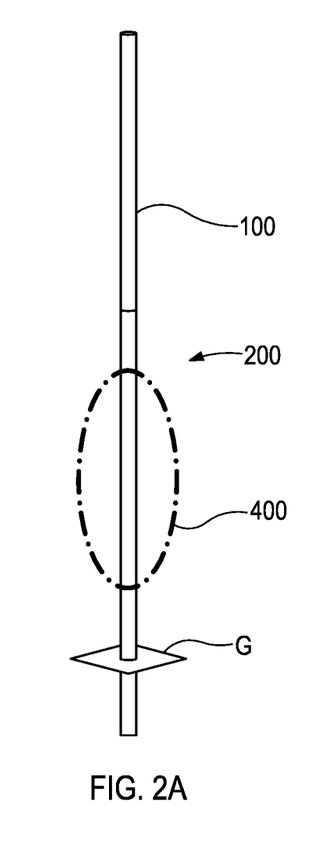
FIGS. 2A-2B illustrate an exemplary sleeve that may be incorporated on the FRP pole of FIG. 1.
Figure 2B:
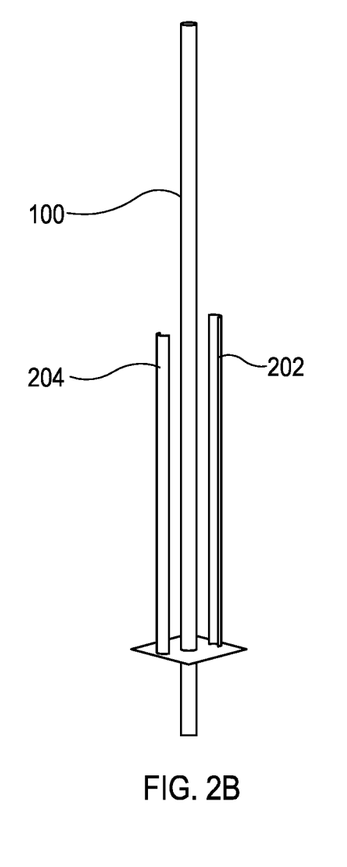

FIGS. 2A-2B illustrate the FRP pole 100 of FIG. 1 when installed in the ground G and having a sleeve assembly 200, according to one or more embodiments of the present disclosure. The sleeve assembly 200 may comprise a first half 202 and a second half 204 that are attachable together to wrap around the FRP pole 100. The first and second halves 202,204 may be connected together via a variety of fastening means, including but not limited to mechanical fasteners, steel pole bands, adhesives, hinges and latches, etc. The sleeve assembly 200 may be filament wound part or a pultruded part and incorporate intumescent or endothermic technology. The first and second halves 202,204 may be unattached to each other (i.e., independent and separable parts), or they may be movably attached together at joint or hinge such that they may move relative to each other between open and closed positions so that it may be opened to position on or remove from the FRP pole 100 and then closed to secure it on the FRP pole 100. As mentioned below, the sleeve assembly 100 may also include a one-piece sleeve style design, where it may be slid over the FRP pole 100 (e.g., from the top or bottom of the pole 100).

The sleeve assembly 200 is designed to protect the FRP pole 100 underlying the sleeve assembly 200 from excessive heat during a fire event. For example, the sleeve assembly 200 may protect the encapsulated FRP pole 100 during a fire event where the sleeve assembly 200 is exposed to temperatures of up to 2,100 degrees Fahrenheit (° F.) for three (3) minutes. Thus, in such examples, the FRP pole 100 may be protected by the sleeve assembly 200 such that the tested FRP pole 100 maintains a percentage of its design strength during the fire event and maintains up to 100% of its design strength after cooling following the fire event.

The sleeve assembly 200 may extend various heights (lengths) along the FRP pole 100 from the ground G. In addition, the sleeve assembly 200 may extend below ground G surface, such that it is provided around the FRP pole 100 and extends from below ground G to a certain height of the FRP pole 100. In the illustrated example, the sleeve assembly 200 extends fully around the FRP pole 100 from a location slightly below the ground G up to a mid-point of the FRP pole 100. However, the sleeve assembly 200 may extend to higher or lower locations along the FRP pole 100 above ground, and/or the sleeve assembly 200 may extend further below ground G level or start right at ground G level. In some examples, the sleeve assembly 200 extends along the entire height (length) of the FRP pole 100 or along the entire above ground G height/length of the FRP pole 100.

Where comprised of first and second halves 202,204, each such half 202,204 may extend the entire height/length of the sleeve assembly 200, or either or both of the halves 202,204 may be comprised of half portions that are stacked on their respective side of the FRP pole 100 to the predetermined height/length of the sleeve assembly 200. In this manner, the height of the sleeve assembly 200 installed on FRP poles 100 in the field may be modified/adjusted by adding/removing half portions such that the ultimate the sleeve assembly 200 has the desired height/length on the particular FRP pole 100.

Figure 3A:
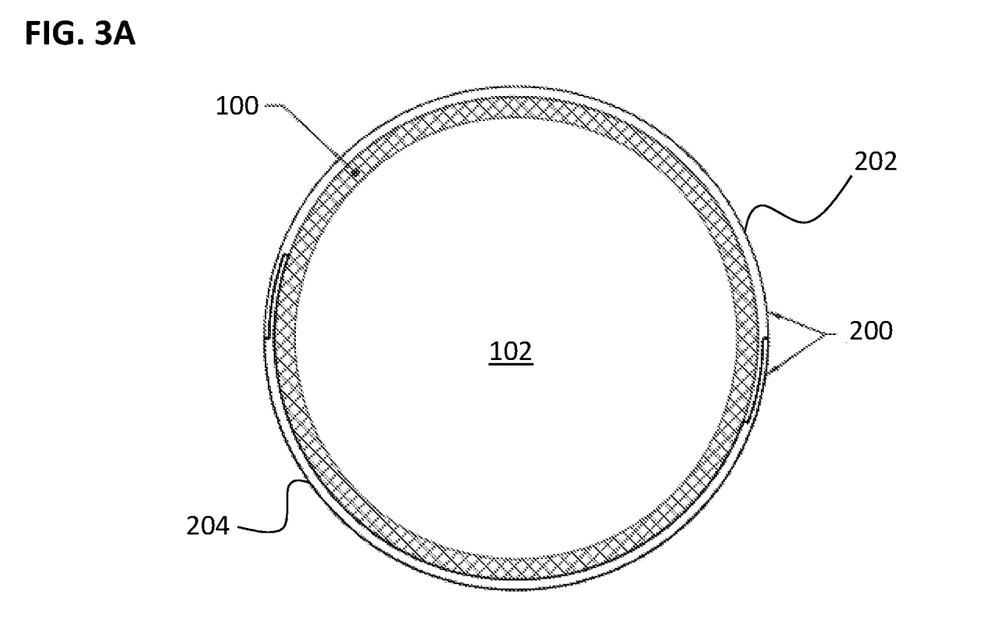
FIGS. 3A-3B illustrate the sleeve of FIGS. 2A-2B.

FIG. 3A illustrates a cross-sectional view of the sleeve assembly 200 installed on the FRP pole 100 of FIG. 2A, according to one or more embodiments of the present disclosure. Here, the FRP pole 100 is walled structure having a hollow interior. However, in some examples, the FRP pole 100 is a solid structure and/or other types of poles may be utilized. In the illustrated example, the sleeve assembly 200, comprised of the halves 202,204, is an outer insulation layer protecting the FRP pole 100 from fire events. In some examples, one or more inner layers are provided between the sleeve assembly 200 and the FRP pole 100, such as an insulated blanket/wrap/sleeve provided directly on and around the FRP pole 100, beneath the sleeve assembly 200.

Figure 3B:
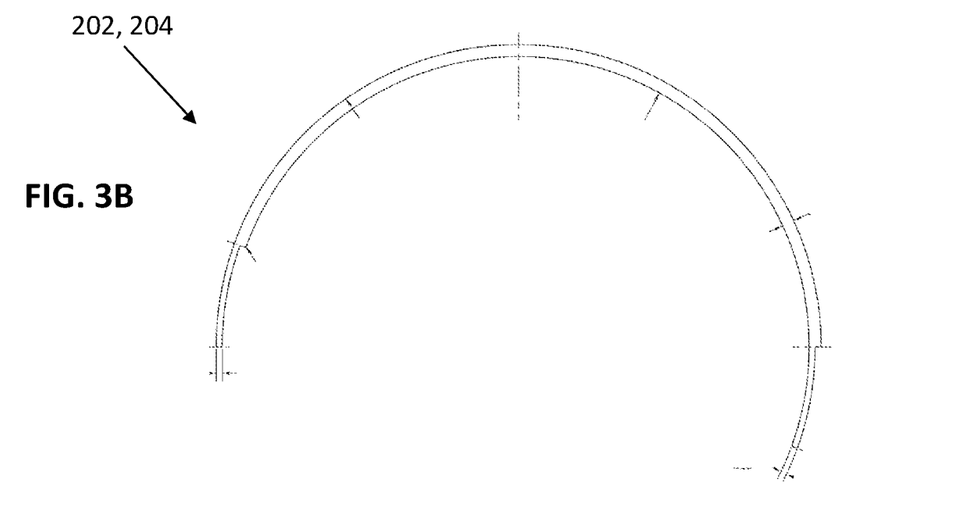

FIG. 3B illustrates a top view of one half (i.e., the first or second half 202,204) of the sleeve assembly 200, according to one or more embodiments of the present disclosure. In the illustrated example, the first and second half 202,204 are identical, such that two like parts are assembled together to form the sleeve assembly 200. The sleeve assembly 200 is configured as an insulator to protect the underlying pole 100 such that, when exposed to a fire condition, the fire event does not heat the core laminate past its maximum temperature threshold. The sleeve assembly 200 may be made from various insulating materials, for example, endothermic insulating composites, thermoset composites such as glass reinforced vinyl ester, intumescent materials, etc. In some examples, the sleeve assembly 200 includes an outer fire resistant coating, such as an acrylic polyurethane or intumescent gel coat. The coating can provide UV protection and/or, be a fire resistant coating such as an intumescent paint. In some examples, the sleeve assembly 200 includes fire resistant or retardant additives. Various types of fire retardant additives and fillers may be utilized, individually or in combination, to achieve optimal fire performance. For example, halogenated fire retardant additives may be utilized, which char rapidly when exposed to fire which helps block heat transfer and keeps additional oxygen from reaching the surface, and/or inorganic fillers may be utilized, such as aluminum hydroxide and magnesium hydroxide, which decompose endothermically when heated giving off water which helps reduce the rate of heat transfer into the composite; and/or small particle size clay fillers as well as the aluminum hydroxide and aluminum oxide (formed in endothermic decomposition of aluminum hydroxide) also help form a char layer during a fire event. Also, the sleeve assembly 200 may be comprised of thermoset resins, endothermic mats, FR additives, pigments, fillers and is coated with either an acrylic polyurethane or intumescent gel coat.

In some embodiments, instrumentation is incorporated on the FRP pole 100 and/or on or within the sleeve assembly 200 provided thereon. The instrumentation may be configured to measure one or more parameters, such as environmental parameters in which the FRP pole 100 is utilized and/or internal parameters of the FRP pole 100 and/or the sleeve assembly 200. For example, the instrumentation may be configured to ascertain whether the FRP pole 100 has been exposed to excessive temperatures that may impair its structural integrity. In such examples, FRP poles 100 may be manufactured with one or more thermocouples provided on the FRP pole 100 (e.g., on an external surface of the FRP pole 100) that may indicate whether the FRP pole 100 has been exposed to excessive temperatures. Here, the sleeve assembly 200 may then be provided over the FRP pole 100 and thermocouple, so as to provide indication of the temperatures beneath the sleeve assembly 200 (i.e., temperatures actually experienced by the FRP pole 100) as such temperatures will be significantly lower than temperatures external the sleeve assembly 200 which is subject to direct fire exposure. In other examples, the thermocouple may be provided within a pocket milled or formed on the FRP pole 100. In even other examples, existing FRP poles 100 may be retrofitted with instrumentation, such as one or more thermocouples. For example, a pocket or recess may be formed in the FRP pole 100 and a thermocouple may be installed therein, and then the sleeve assembly 200 provided on the FRP pole 100. In yet another example, a continuous thermocouple wire may be processed into the laminate or positioned underneath the sleeve assembly 200.

Figure 4A:
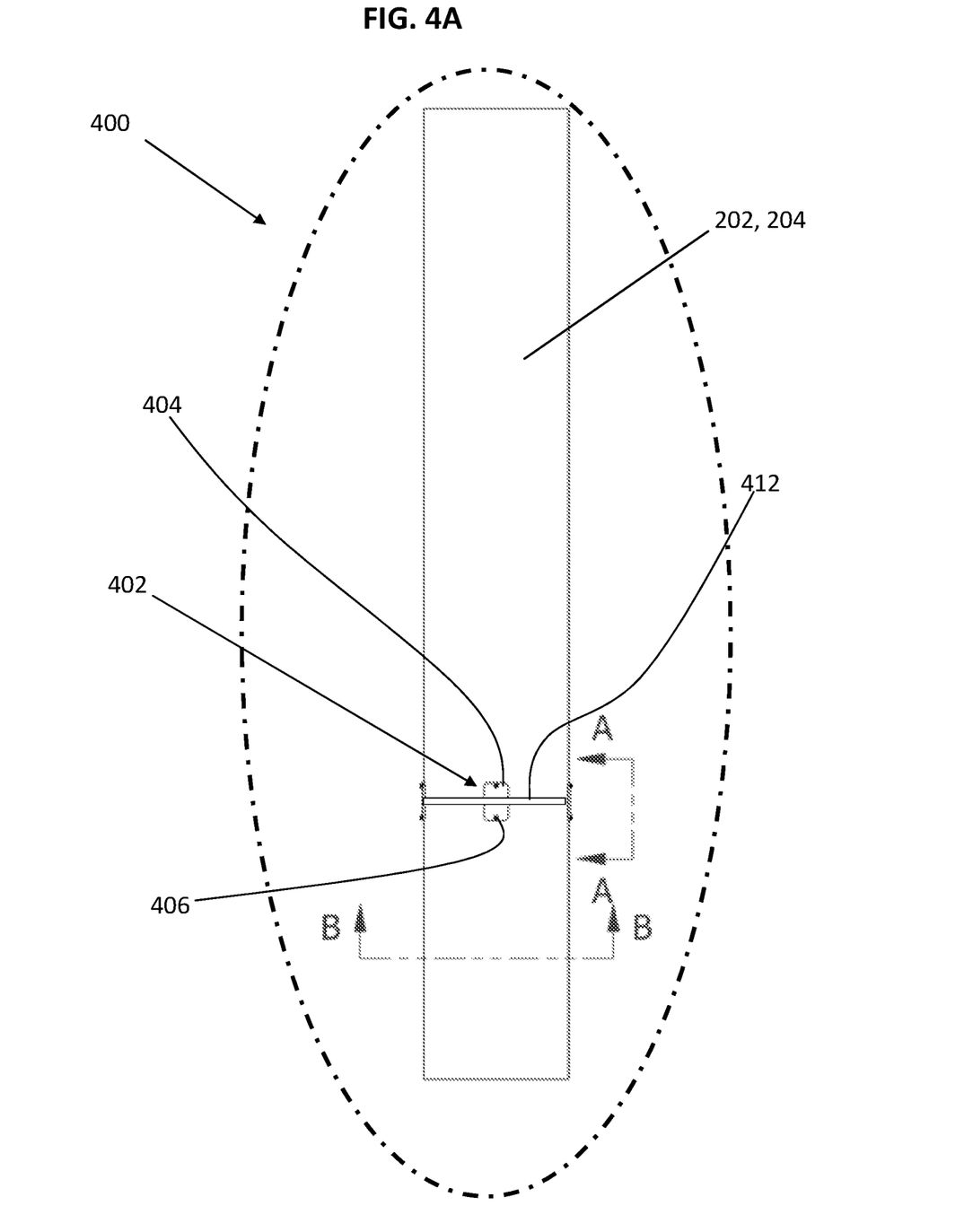
FIG. 4A illustrates a segment of the FRP pole with sleeve assembly shown in FIG. 2A.
Figure 4B:
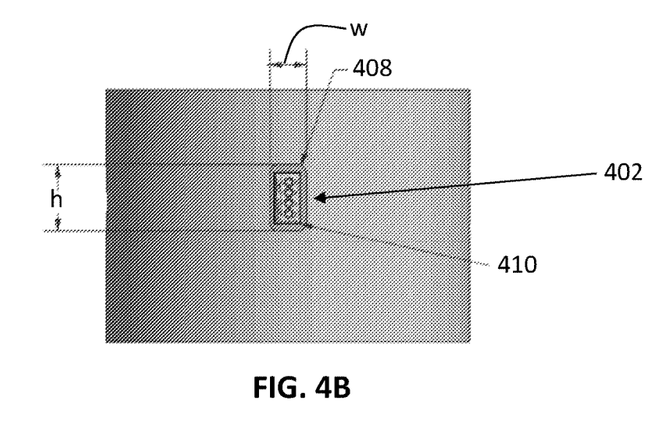
FIG. 4B illustrates view A-A identified in FIG. 4A.
Figure 4C:
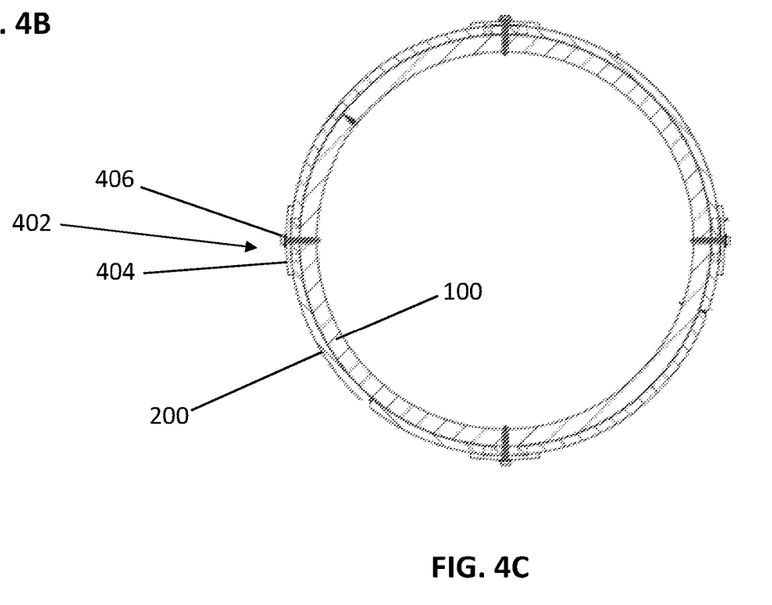
FIG. 4C illustrates cross-section B-B identified in FIG. 4A.

FIGS. 4A-4E illustrate exemplary instrumentation utilizable with embodiments of the FRP pole 100 and/or the sleeve assembly 200 described herein. In particular, FIG. 4A illustrates a segment 400 of the sleeve assembly 200 installed on the FRP pole 100 identified in FIG. 2A. FIG. 4B illustrates view A-A identified in FIG. 4A and FIG. 4C illustrates cross-section B-B identified in FIG. 4A. In the illustrated example, a plurality of instrumentation locations 402 are provided about the sleeve assembly 200, with temperature measurement instrumentation (see FIGS. 4B, 4D, and 4E) provided at each such location 402. Here, the locations 402 are provided radially and equidistantly about the assembly 200; however, they may be provided asymmetrically there about. Also, the locations 402 are illustrated as being located at a certain height (axial location) on the assembly 200/pole 100; however, they may be provided at the different axial locations and/or one or more additional sets of instrumentation location 402 may be provided in addition to or in lieu of the foregoing. At each location 402, an instrument (not illustrated) is provided and covered with a cover (plate) 404. The one or more covers 404 may be attached to the halves 202,204 of the assembly 200 via a variety of means. For example, one or more fasteners (screws) 406 may be utilized to attach each of the covers 404 to its respective half shell portion 202, 204. One or more additional means may be utilized for securing the covers 404 over their respective opening 408, such as a band (ring) 412. In some examples, the covers 404 include side flanges that may be slid into mating grooves/slots formed in the half shell portions 202, 204. In some examples, the covers 404 may be attached via an articulating hinge.

Figure 4D:
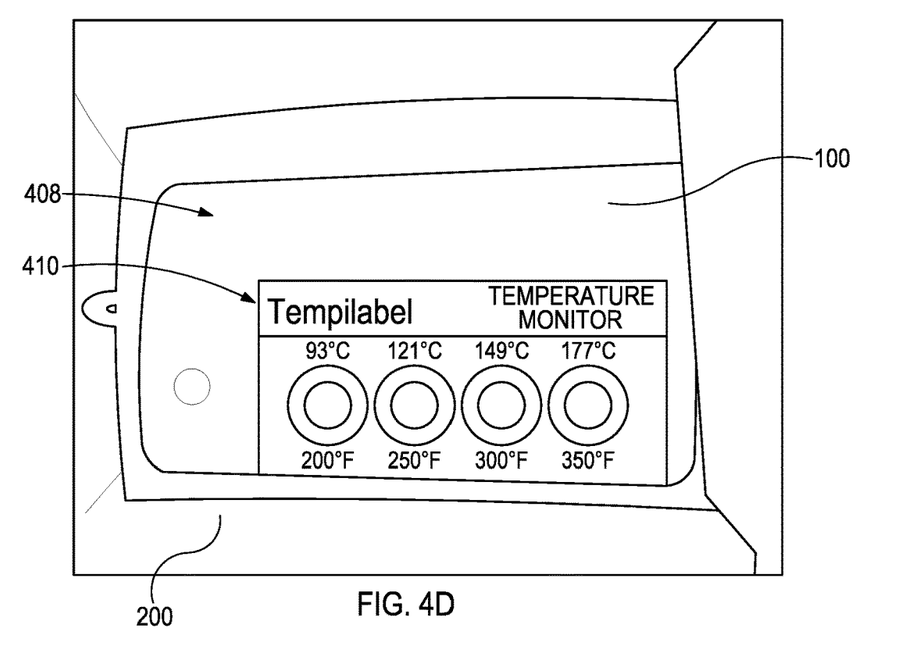
FIGS. 4D and 4E illustrate exemplary temperature sensors utilizable as shown in FIG. 4B.
Figure 4E:
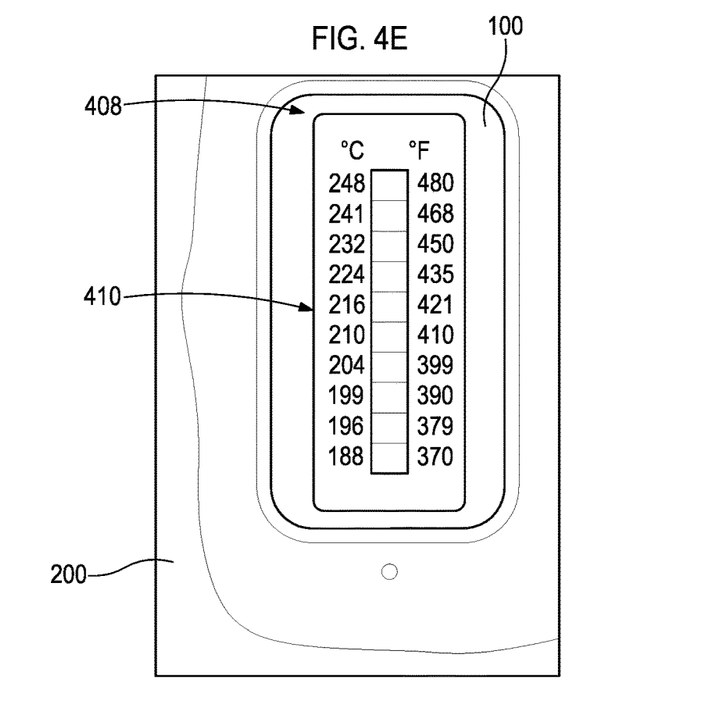

FIGS. 4B, 4D, and 4E illustrate the assembly 200 with the cover 404 having been removed to expose an exemplary instrumentation. Here, the instrumentation is a thermocouple 410. Here, the recess or opening 408 formed in the assembly 200 halves 202, 204 has width w and height h, and in these examples, the covers 404 are sized with larger dimensions so as to cover such opening 408. In the example of FIG. 4D, the thermocouple 410 is a Tempilabel®. In the example of FIG. 4E, the thermocouple 410 is a termperature indicative label from LCR Hallcrest. However, FIGS. 4D-4E illustrates just two example thermocouples 400 that may be installed on the FRP pole 100, and various other types of thermocouples or devices configured to measure temperature of the FRP pole 100 may be utilized in addition to or in lieu thereof. Here, the thermocouple 410 includes four (4) different indicator screens indicative of an encountered temperature, but the thermocouple may be differently configured with more or less screens and/or to differently display encountered temperature. In some examples, one or more of the thermocouples 400 is a permanent device in the form of a decal or piece of metal that depicts the maximum recorded temperature. In addition to or in lieu of the thermocouples, other types of temperature indicators/sensors may be utilized. In some examples, metal tags with a known melt point may be utilized as a permanent temperature-measuring device, where the metal tag will melt if exposed to a temperature greater than the melting point of the metal tag.

In some examples, the plates 404 are steel access covers. The thermocouples 410 are positioned under the cover plates 404 that protect the thermocouples 410 from vandalism and tampering, etc. In the above illustrated example, the metallic ring 412 is also provided around the fire protection sleeve assembly 200 at location thereon corresponding with the plates/panels 404 covering the temperature indicators 410, so as to further protect them from unauthorized access and further inhibit tampering and vandalism. The ring 412 may also be beneficial in embodiments where the fire protection sleeve assembly 200 has a clam shell configuration comprising shell halves 202, 204, where incorporation of such ring 412 will help maintain closure of the shell halves 202,204 together and inhibit unauthorized separation thereof.

Following a fire event (i.e., post fire), the plates 404 are removed to expose the thermocouples 410, thereby permitting the user (i.e., utility company inspector) to ascertain (determine) the magnitude of the heat exposure from the fire event.

In the illustrated examples of FIG. 4D-4E, the thermocouples 410 are irreversible and would need to be replaced after being exposed to a fire event. However, types of instrumentation may be used instead (or together therewith) that is reusable yet still able to provide indication of experienced temperature during a prior fire event and that need not be replaced after being exposed to a fire event.

Also, the FRP pole 100 may include instrumentation and/or equipment configured to provide various types of audible and/or visual indicators for inspectors to ascertain encountered temperatures. As mentioned, one or more such thermocouples may be spaced at different radial sides of the assembly 200 and/or at different vertical dimensions (i.e., heights) along the FRP pole 100, and/or various different types of thermocouples may be utilized in various combinations as may be advantageous for a particular end use application.

Figure 5:
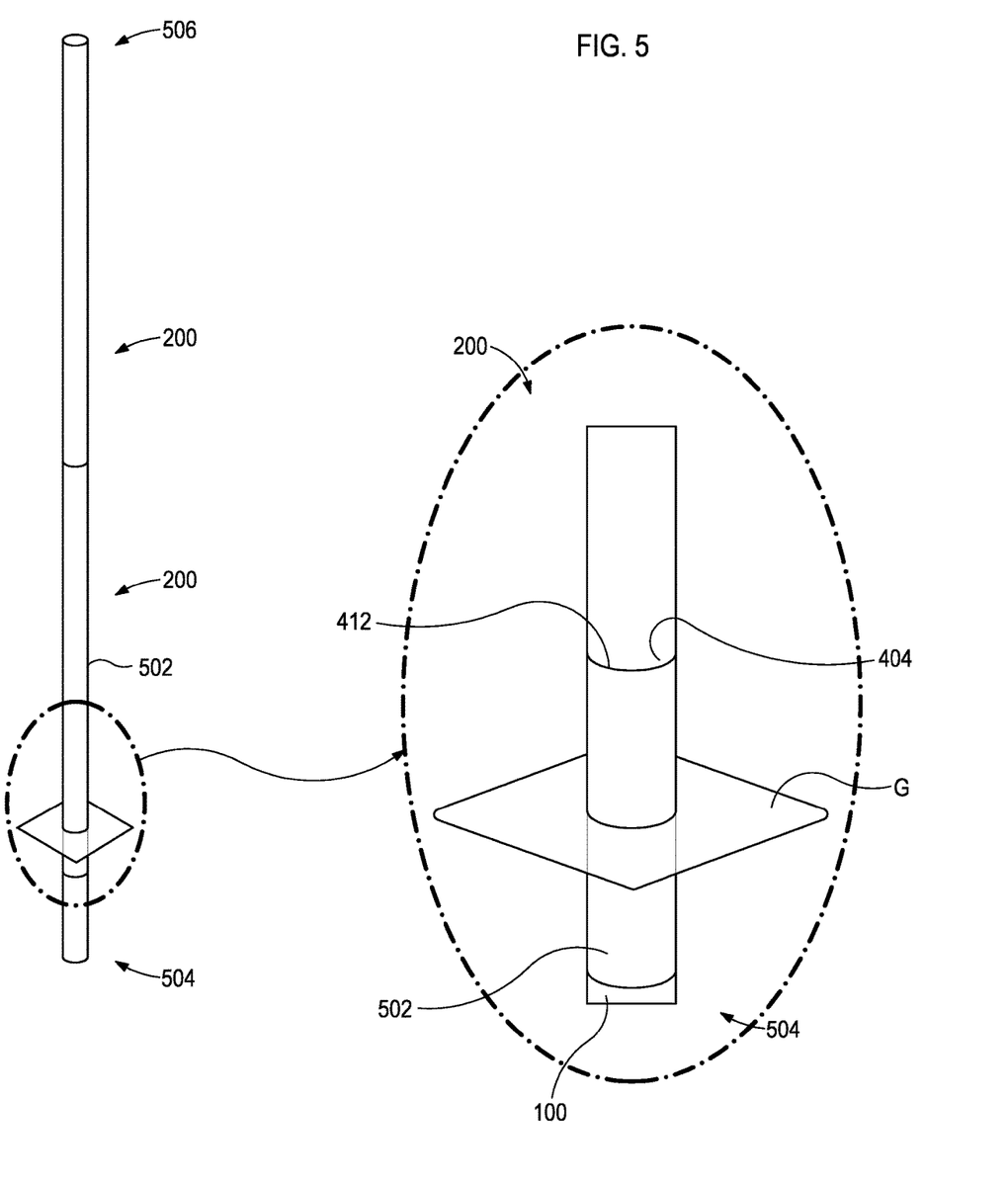
FIG. 5 an example sleeve assembly having a one-piece body design.

As described above, the sleeve assembly 200 may have a two-piece design. However, the sleeve assembly may instead incorporate a one-piece design. FIG. 5 also illustrates an example where the assembly 200 has a one-piece body 502 design, according to one or embodiments of the present disclosure. The one-piece body 502 may be a hollow cylinder that is slidable over the FRP pole 100, e.g., from a bottom end 504 and/or from a top end 506 of the FRP pole 100. For example, the sleeve assembly 200 may be installed on the FRP pole 100 during manufacture of the FRP pole 100 and, in such cases, the body 502 may be slid on (i.e., slid over the FRP pole 100) from either the top end 506 or the bottom end 504. Also, sleeve assemblies 200 utilizing the one-piece body 502 design may be installed on existing FRP poles 100 in the field by being slid over the FRP 100 from the top ends 506 thereof. For example, an already installed FRP pole 100 not having a fire sleeve (or previously having a fire sleeve that has been removed) may be retrofitted with a fire sleeve by sliding the body 502 over the top end 506 thereof.

The sleeve assembly 200 may vary in length. For example, while the fire sleeve assembly 200 may be designed with an overall length appropriate to cover the entire length of the FRP pole 100, the sleeve assembly 200 may be provided on the FRP pole 100 at locations thereon that would be most vulnerable when exposed to a fire event. Thus, the assembly 200 may extend below the ground surface G, for example, 3 feet below ground, and extend upward therefrom towards the top end 506 some height to be determined based on the shrub life and vegetation existing at and surrounding the location at which the FRP pole 100 is to be installed (e.g., extends higher if taller trees located there as compared to low lying shrubs and grasses).

When the sleeve assembly 200 is provided as one-piece hollow cylinder body 502, it may be cut to length at the factory where it is produced and then installed on the FRP pole 100 before they are utilized/installed in the field. For example, the fire protection sleeve provided as a hollow cylinder may be installed on the FRP pole 100 at the factory by the utility pole OEM and then installed in the field with the one piece cylinder fire sleeve 502 provided thereon. In other embodiments, the fire protection sleeve 200 is provided as a multi-piece design, for example, with a two piece "clam shell" design that may be clamped around the pole. In some examples, the clam shell design may be utilized to retrofit utility poles in the field that have experienced fire events. For example, the clam shell design fire protection sleeve may be placed over charred sections of the utility pole and/or charred sections of the outer layer of the fire protection sleeve 200. Thus, with regard to FRP poles 100 that have experienced a fire event, the prior (charred) fire sleeve assembly may first be removed and then the new clam-shell designed sleeve assembly 200 may be installed thereon or the new clam-shell designed sleeve assembly 200 may be installed over the prior (charred) fire sleeve assembly.

Regardless of whether the sleeve assembly 200 is provided as a one-piece design shell, or as a two or more piece design (e.g., clam-shell) shell, the assembly 200 may be provided an interior layer on an inner surface thereof that is arranged to be in contact with an outer surface of the FRP pole 100. In such embodiments, the interior layer may be an endothermic mat, intumescent mat, and/or and fiberglass mat, and such mats may be connected to the outer shell layer via fire resistant resins (e.g., polyester and/or vinyl ester resins) or adhesives. Thus, where the assembly 200 is provided as a one-piece cylindrical design, the interior layer may be a one-piece cylindrical sleeve arranged within a bore of the cylindrical body 502, and where the assembly 200 is provided as a clam shell design with halves 202,204, the interior layer may comprise interior layer halves comporting in size with their respective half portion 202/204 and provided the respective inner surface thereof.

The instrumentation (e.g., temperature indicator/thermocouple) may be provided such that it measures temperature beneath the fire protection sleeve 200, for example, the temperature on an external surface of the utility pole 100, but beneath the inner layer of the fire protection sleeve assembly 200, or the temperature on an external surface of an inner fire protection sleeve 200 initially installed on the FRP pole 100, but beneath the inner layer of an outer fire protection sleeve 200 that may have been retrofit over the initial (inner) fire protection sleeve assembly 200. Various types of temperature indicators may be utilized, including single use (irreversible) temperature indicates that provide indication when a threshold temperature is exceeded, or various other types of temperature indicators. For example, digital temperature gauges may be provided to provide real time temperature measurements, and such information may be sent to a computer system and logged, and even trigger an alarm to alert the end user that certain temperatures were encountered at a certain utility pole such that the end user may be alerted to inspect that utility pole for structural soundness.

To install the temperature indicator, a portion of the outer and inner layers of the assembly 200 may be removed to create a window through the fire protection sleeve assembly 200 and thereby expose what lies beneath the sleeve assembly 200. For example, a piece of the outer sleeve may be removed and then a piece of the inner layer (e.g., the endothermic mat) may be removed to expose a surface of the utility pole at which the temperature indicator is located. Then the portion of the inner layer previously removed may be provided over the temperature indicator, and a fire-resistant caulking may applied to reattach the previously removed inner layer to the surrounding inner layer, and then the cover 404 or plate may be secured thereon, and the cover or plate may be further secured via various mechanical fasteners 406 and locking systems (e.g., the ring 412) to inhibit tampering and vandalism.

Figure 7:
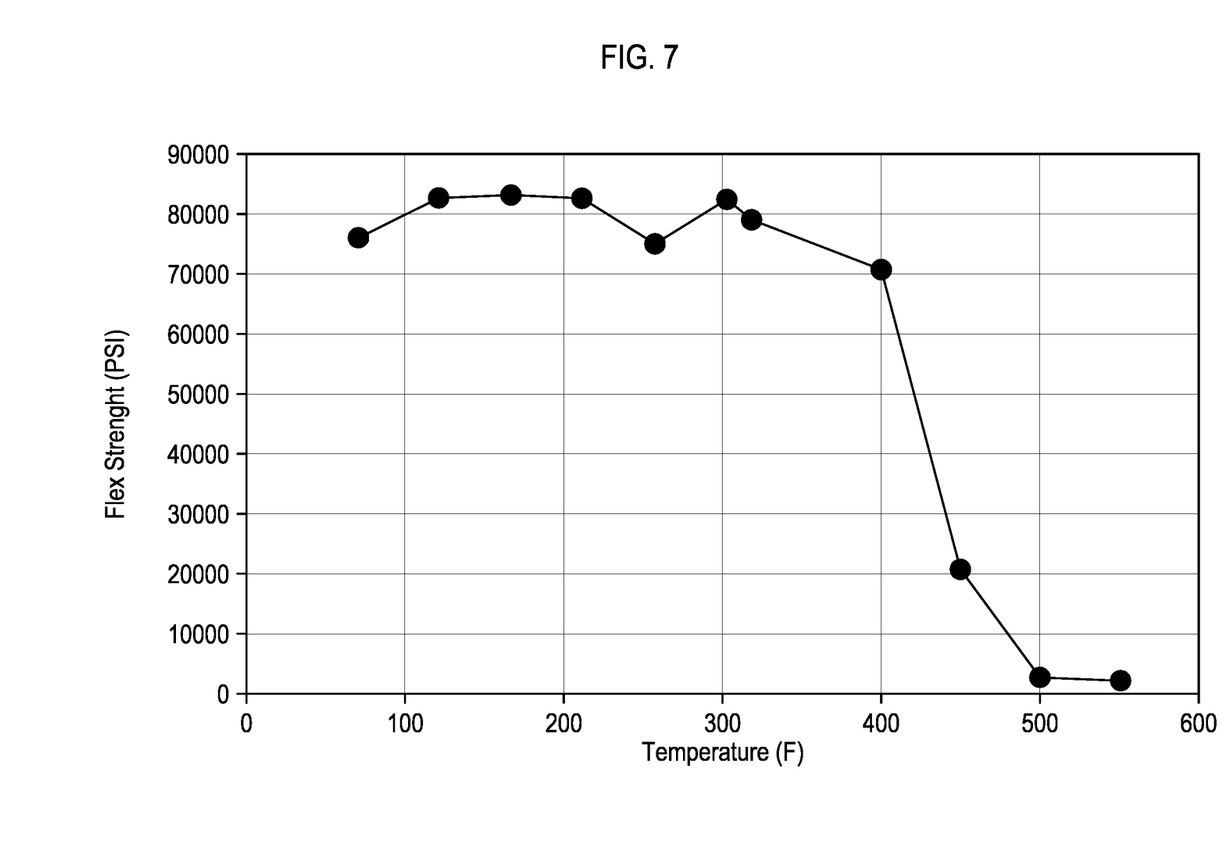
FIG. 7 a strength vs. temperature graph or plot.

The maximum recorded temperature indicated by the instrumentation (e.g., the thermocouple 410) may be evaluated on a temperature vs. strength retention chart specific to the standard FRP pole 100 utilized. Based on the temperature excursion, during the fire event, the pole strength retention is determined. The utility company (end user) can decide to repair the insulating composite sleeve and keep the FRP pole 100 in service or to replace the entire FRP pole 100 structure. FIG. 7 illustrates an example flex strength vs. conditioning temperature for evaluating temperature exposure of an FRP pole 100.

As exemplified in the temperature vs. strength plot of FIG. 7, if the maximum pole temperature is limited to 400° F. during a fire event, then a significant amount of the pole strength can be retained. Accordingly, the FRP pole 100 may include a plurality of thermocouples 410 arranged beneath the sleeve assembly 200 to record the maximum temperature during an extreme fire event. In some examples, just one of the thermocouples is utilized, whereas in other examples, two (2) or three (3) are utilized, but more or less may be utilized without departing from the present disclosure. In one example, the thermocouple(s) 410 was installed one the FRP pole 100 at approximately two feet from the ground line. Then, after a fire event, the FRP pole 100 can be inspected by revealing the thermocouple 410 and verifying the maximum temperature reading on the thermocouple 410. The thermocouple 410 may be located directly on the pultruded FRP pole 100, below the ¼" thick fire protection sleeve 200. As mentioned, the thermocouple 410 may be covered with a piece of the fire sleeve and a stainless-steel cover.

If the thermocouple's 410 maximum reading is 400° F. or below, the intumescent mat layers can be removed. The pole can be re-shielded utilizing a pultruded clamshell made of the same material and thickness as the original fire protection sleeve, for example, a sleeve assembly 200 may be installed on the original FRP pole 100. The clamshell (i.e., the sleeve assembly 200) can be predrilled to match the a utility's particular pole drill pattern and then placed around the FRP pole 100 and clamped into place with stainless steel banding readily available in the utility industry. The FRP pole 100 is then ready for the next fire event. If the thermocouple's 410 reading is above 400° F., the FRP pole 100 should be considered for removal and replacement to protect the circuit resiliency.

In some embodiments, a plurality of temperature sensors are connected to a controller, which the inspector may read to ascertain temperatures at various locations on the FRP pole 100 at which the sensors are located. In some embodiments, the temperature sensors are configured to provide visual and/or audible feedback of encountered temperatures. In some embodiments, a plurality of FRP poles 100, each having a controller and plurality of temperature sensors connected thereto, are connected in a network and software is utilized to remotely monitor the plurality of FRP poles 100 encountered temperatures.

The assembly 200 may generally comprise an insulating fire protection composite sleeve made up of fire-resistant resins, fiberglass, and endothermic mats. The endothermic mat is a high temperature insulating mat that provides protection from fire by releasing chemical bound water to significantly limit heat transfer through the material. The alkaline earth silicate fiber chemistry limits heat and fire penetration. The filled resin system produces chemical bound water when the fire reached a certain temperature. The fiberglass mat and roving provide additional insulation while providing strength and stiffness to the sleeve. As mentioned, in some embodiments, the poles 100 and/or assemblies 200 are instrumented with one or more thermocouple gauges for notifying an inspector if the temperature excursion exceeded a threshold temperature (e.g., the glass transition temperature Tg).

FIGS. 6A-6E illustrate an alternate example of a utility pole system 600, according to one or more alternate embodiments. In the illustrated example, the utility pole system 600 includes the FRP pole 100 with the sleeve assembly 200 provided thereon. The illustrated sleeve assembly 200 is shown as a one-piece design, but may instead be a two or more pieces design (e.g., the clam shell design) as detailed herein. In the illustrated example, a plurality of lag screws 602 are utilized to locate the sleeve assembly 200 on the FRP pole 100. The system 600 also includes a butt cap 604 provided at the bottom end 504 of the pole 100 and a but cap 606 provided at the top end 506 of the pole 100 so as to enclose the hollow pole 100. In addition, a tag 606 may be located on the sleeve 200 so as to provide information about the particular pole and/or sleeve.

Figure 6A:
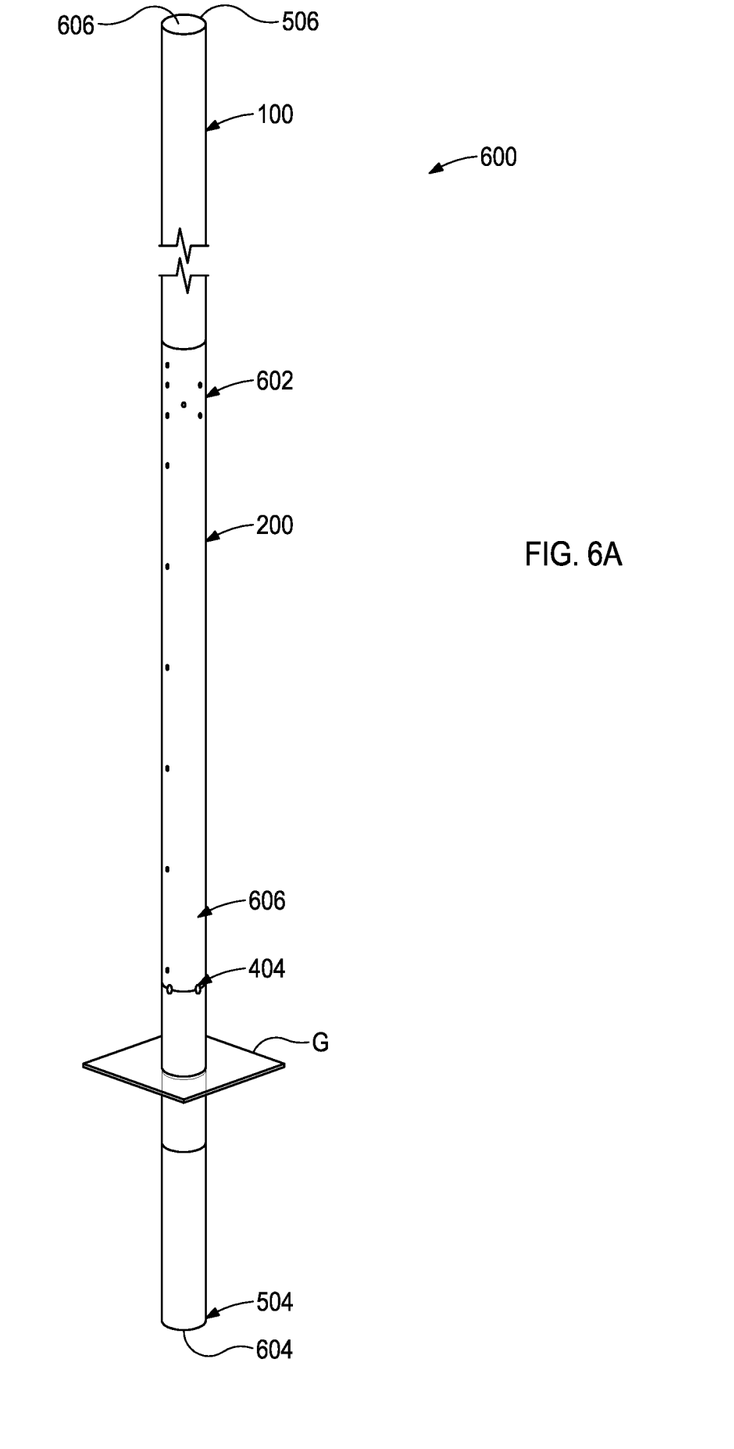
FIG. 6A-6E illustrate an alternate example sleeve assembly.
Figure 6B:
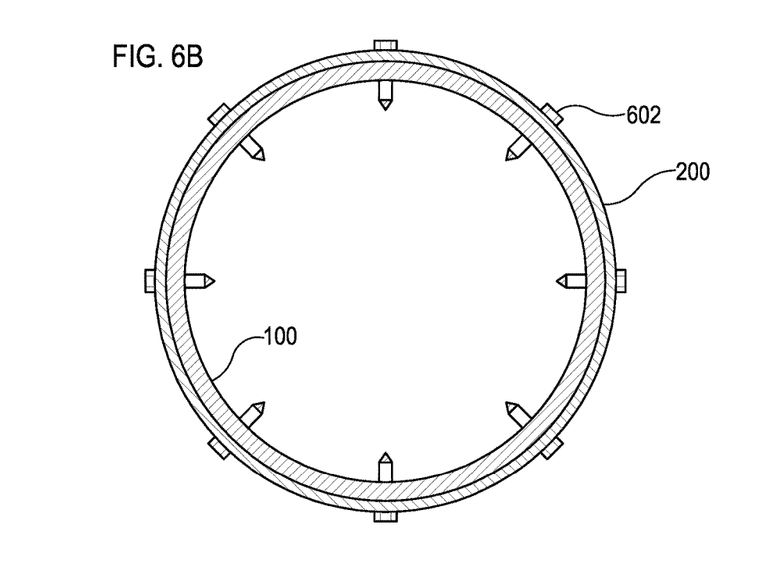

FIG. 6B shows a cross sectional view of the utility pole system 600 at the location where the lag screws 602 are installed. It will be appreciated, however, that the lag screws 602 may be installed at one or more different cross sectional locations along the system 600 in addition to or in lieu of the illustrated example. Here, the lag screws 602 are hex head screws that extend through the sleeve assembly 200 and into and through the FRP pole 100.

Figure 6C:
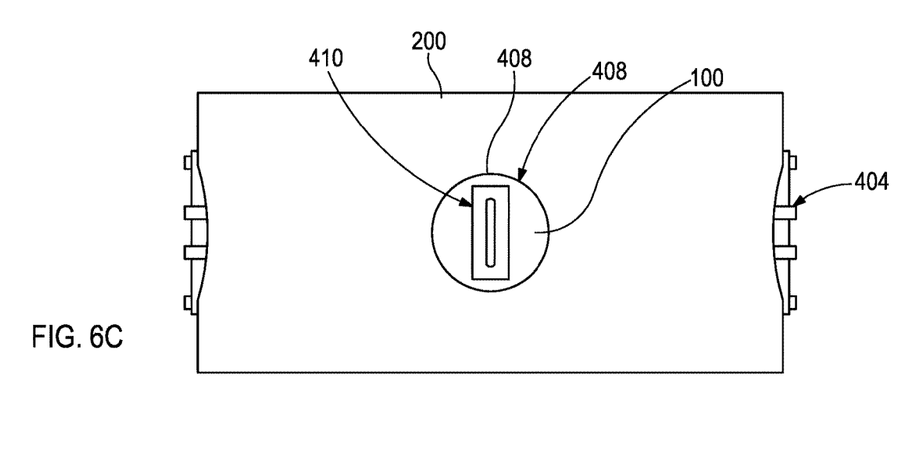

FIG. 6C shows partial view of the system 600 where the one of the covers 404 has been removed to expose a thermal marker 410 arranged on the FRP pole 100. In this example, each cover 404 and underlying recess 408 is circular in shape, and the covers may be secured to the sleeve assembly 200 via a plurality of screws 406 and a band clamp 412.

Figure 6D:
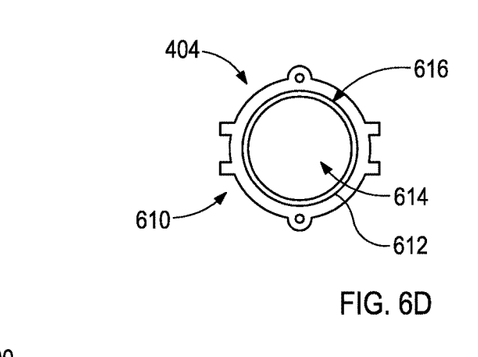
Figure 6E:
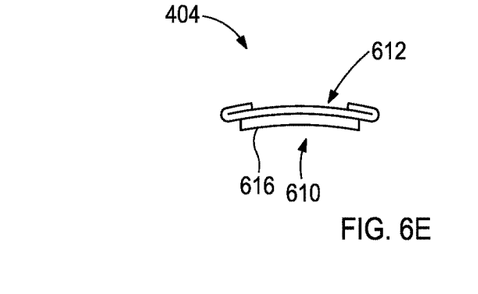

FIGS. 6D-6E illustrate an example cover 404, according to one or more embodiments of the present disclosure. In particular, FIG. 6D illustrates an interior side 610 of the cover 404. As mentioned, the cover 404 may be a metallic (e.g., stainless steel) material. Here, the cover includes an outer metallic layer 612, which is visible from an exterior of the system 600 when the cover 404 is mounted on the sleeve assembly 200 as shown in FIG. 6A. On the interior side 610 of the cover 404 is an insulation material 614 surrounded by a gasket 616. The insulation material 614 may comprise the insulation material utilized in the construction of the sleeve assembly 200, as describe herein, such that the openings 408 are adequately insulated and do not compromise the system's 600 overall fire protection characteristics. For example, the insulation material 614 may comprise the intumescent material. The insulation material 614 is sized to fill the opening 608. Thus, the insulation material may be formed form the cut out piece of the sleeve assembly 200 that was removed to create/form the opening 608, such that it has the appropriate surface area and depth to adequately fill the opening 608. The gasket 616 may comprise various fire retardant materials, for example, a fire putty, to fill any machining kerf that may exist between the sleeve assembly 200 and the insulation material 614. The outer metallic layer 612 may include rails 618 for receiving the band clamp 412.

Thus, the system 600 includes a fire retardant sleeve assembly 200 covering the FRP pole 100, where the sleeve assembly 200 comprises a custom sized composite fire barrier system that protects at least a base of the FRP pole 100 from fire events and excessive heat generated by a typical brush or grass fire. The fire retardant sleeve assembly 200 protects the FRP pole 100 and shields the FRP pole 100 from heat in excess of that slightly above the glass transition temperature of the FRP pole 100 such that no permanent loss of strength is observed in the FRP pole 100 so that it may remain in service and be structurally sound. Because the system 100 further includes temperature indicators (e.g., such as an irreversible temperature monitoring decal/label) positioned at various spots around the FRP pole 100, and underneath the sleeve assembly 200, it is possible to identify and record the temperature that the FRP pole 100 (i.e., the temperature at the surface of the FRP pole 100) reached during a fire event. Various numbers of the temperature indicators may be utilized, for example, a grouping of temperature indicators radially positioned around the surface of the FRP pole 100 at a particular height, or more than one such grouping of temperature indicators positioned at various heights. In one example, a grouping of temperature indicators are positioned approximately two (2) feet above ground surface, which coincides with the maximum moment location of the pole 100. An inspector may access one or more of the access covers 404 to inspect the temperature indicators situated underneath the cover 404, to visually evaluate and determine the maximum temperature experienced at that location of the FRP pole 100. After use, the temperature indicators may be removed and replaced with new unused temperature indicators.

Figure 8:
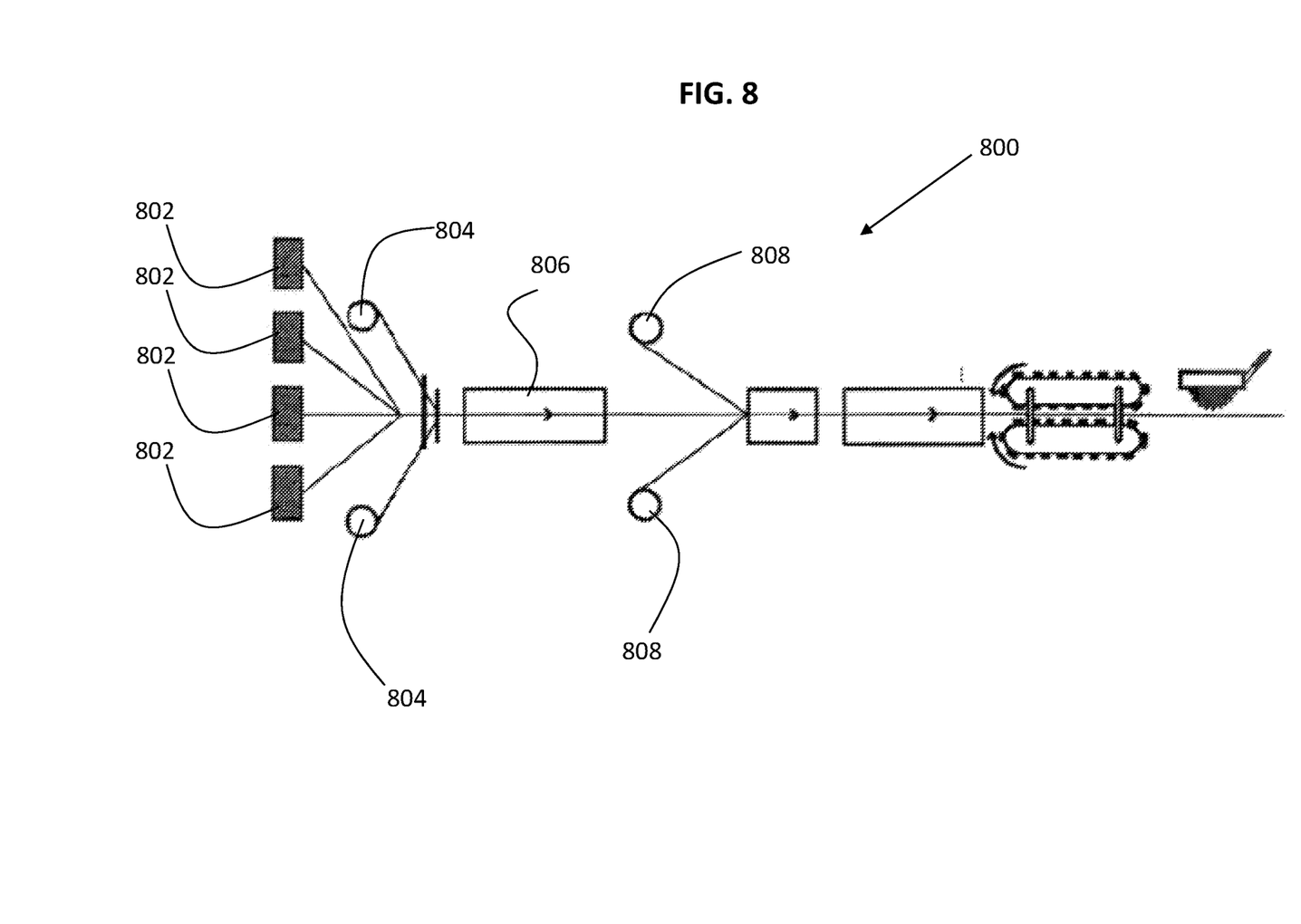
FIG. 8 illustrates an exemplary pultrusion process of manufacturing a sleeve assembly.

FIG. 8 illustrates an exemplary pultrusion process 800 of manufacturing the sleeve assembly 200, according to one or more embodiments. Strands of filament from fiberglass rovings 802 and top and/or bottom fiberglass mats 804 are pulled by pultrusion equipment, and fed through a resin bath or impregnator 806, where the fibers 802 and mats 804 are coated with the resin. The resin may have one or more fillers, additives, and or colorants. In some examples, the resin includes fire retardant additives/fillers, and is thus a fire retardant resin. The pultrusion equipment thereafter guides the resin impregnated fibers 802 and mats 804 downstream to where top and/or bottom layers 808 are be provided and secured thereon via the impregnated resin. Here, the top and or bottom layers 808 are endothermic mats and/or intumescent mats. In one example, the only a top or bottom layer 808 is provided, with such endothermic or intumescent material layer 808 defining the inner surface of the sleeve assembly 200. Either or both of the endothermic mat and/or intumescent mat may be utilized. Endothermic mats are insulators that give off moisture when exposed to heat, whereas intumescent mats utilize graphite and swell/expand when subject to heat exposure thereby leading to an increase in volume and decrease in density which inhibits flame propagation.

As described herein, the fire sleeve assemblies 200 may be pultruded as a one-piece cylinder that is slid down over the FRP pole 100, or putruded as a one or two piece claim shell design that may be utilized to retrofit existing poles and/or repairing existing FRP poles 100 in the field which have already been installed with the fire sleeve assembly but need a new fire sleeve assembly mounted thereon after being exposed to a fire event. Indeed, the one or two piece claim shell design of the sleeve assembly 200 may be provided on newly manufactured FRP poles 100.

Also described in here is a repair method for FRP poles 100. The repair method may be utilized on FRP poles 100 having previously been deployed with sleeve assemblies 200, whether the sleeve assembly 200 incorporates a one-piece sleeve design or a clam shell design. In one example embodiment of the repair method, the method includes inspecting an existing FRP pole 100 outfitted with a sleeve assembly 200 that has been subjected to a fire incident. The repair method then includes a second step of removing any bad or damaged sections of the sleeve assembly 200 damaged during the fire incident and cleaning up the surrounding areas. The repair method then includes a third step of preparing the surface (or surface preparation) of the remaining sleeve assembly 200 and/or FRP pole 100, for example by sanding or abrading the surface and then wiping down the surface with a rag. The repair method then includes a fourth step of applying a primer. In one example, the primer is a two-component polyurethane system primer which will be blended and mixed, and then applied over the surface area to be repaired. The repair method then includes a fifth step of applying a new sleeve assembly. In one example, the new sleeve assembly is an endothermic (or intumescent) wrap that is pre-impregnated with resin (and/or other fire retardant fillers, additives, pigments, etc. as described above). The pre-preg endothermic mat may be wrapped around the FRP pole 100, and then the loose/free end (or terminal end) may be secured to the structure via a mechanical fastener, such as Tiger Tabs™ retention system which are tabs with claws that go through the outer layer of the mat and grip into the underlying layers of the mat and hold it in place while it cures. The repair method then includes a sixth step of applying a compression system, such as Stricture Banding™ which compresses the mat on the FRP pole 100. The repair method may then include an seventh step of perforating the compression layer and the mat layer to remove air bubbles trapped during the prior steps. Such release of air is aided by utilization of the compression system. Thereafter, the repair method may include a eighth step of curing. Thereafter, the repair method may include a ninth step of applying a coating or paint as detailed herein.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A utility pole protection system, comprising:
a fire retardant sleeve assembly configured to be arranged on a utility pole, the fire retardant sleeve assembly having an outer shell and an inner insulation layer, wherein the inner insulation layer is fixed to an inner surface of the outer shell; and
a temperature sensor configured to measure a temperature experienced adjacent to the inner insulation layer, wherein the temperature sensor is covered by the fire retardant sleeve assembly.

2. The utility pole protection system of claim 1, wherein the fire retardant sleeve assembly includes an opening in the outer shell and the inner insulation layer, wherein the temperature sensor is positioned within the opening, and wherein a cover plate is positioned over the opening.

3. The utility pole protection system of claim 2, wherein the fire retardant sleeve assembly includes a locking ring configured to extend around the outer shell and the cover plate.

4. The utility pole protection system of claim 1, wherein the outer shell comprises a fiberglass material and the inner insulation layer comprises an intumescent material.

5. The utility pole protection system of claim 4, wherein the inner insulation layer is fixed to the inner surface of the outer shell via a fire resistant adhesive or resin.

6. The utility pole protection system of claim 1, wherein the inner insulation layer is laminated to the inner surface of the outer shell.

7. The utility pole protection system of claim 1, wherein the fire retardant sleeve assembly comprises a pair of separable half sections that, when connected together define a hollow cylinder.

8. The utility pole protection system of claim 7, further comprising a locking mechanism for securing the pair of separable half sections together.

9. The utility pole protection system of claim 1, wherein the fire retardant sleeve assembly has a hollow cylindrical body defined by the outer shell and the inner insulation layer.

10. The utility pole protection system of claim 1, further comprising a fire resistant coating on an outer surface of the outer shell.

11. The utility pole protection system of claim 1, further comprising an ultra violet protective coating on an outer surface of the outer shell.

12. The utility pole protection system of claim 7, wherein the pair of separable half sections are movably attached together by a hinge.

13. The utility pole protection system of claim 1, wherein the inner insulation layer is laminated to the outer shell, thereby forming a laminate, and the temperature sensor is an irreversible temperature label.

14. The utility pole protection system of claim 1, wherein the outer shell comprises a fire retardant additive selected from a halogenated fire retardant additive, aluminum hydroxide, magnesium hydroxide, a clay filler, or a combination thereof.

15. The utility pole protection system of claim 1, wherein the outer shell is composed of an acrylic polyurethane or intumescent gel coat.

16. The utility pole protection system of claim 1, wherein the inner insulation layer is an endothermic material.

17. A fire protection system, comprising:
a fire retardant sleeve comprising an outer layer, an insulation layer, and an opening, wherein the insulation layer is fixed to an inner surface of the outer layer, and wherein the opening extends through the outer layer and the insulation layer;
a temperature sensor positioned within the opening and configured to measure a temperature of an environment adjacent to the insulation layer; and
a cover positioned over the opening such that the temperature sensor is located beneath, and covered by, the cover.

18. The fire protection system of claim 17, wherein the environment is a surface of a utility pole, and wherein the temperature sensor is configured to measure the temperature of the surface of the utility pole based on the fire retardant sleeve being mounted to the utility pole.

19. The fire protection system of claim 17, wherein the fire retardant sleeve comprises a body composed of at least two longitudinal sections, and wherein each of the at least two longitudinal sections comprises a portion of the outer layer and a portion of the insulation layer.

20. The fire protection system of claim 19, wherein the at least two longitudinal sections comprises a first section and a second section coupled together by a hinge.

* * * * *